United States Patent [19]

Fucito et al.

[11] Patent Number: 5,446,843
[45] Date of Patent: Aug. 29, 1995

[54] INTERFACE UNIT FOR DYNAMICALLY CONFIGURING A BUFFER IN DIFFERENT MODES TO STORE DATA TRANSFERS BASED UPON DIFFERENT CONNECTION DETAILS OF CONNECTED PROCESSING UNITS

[75] Inventors: Michele Fucito, Meta; Maruo Recchia, Rome; Silvestro Puglia, Pomezia; Claudio Mariani, Rome; Giulio Colangeli, Gerenzano di Roma; Antonio Rotunno, Salerno, all of Italy

[73] Assignee: Alcatel Italia SpA, Milan, Italy

[21] Appl. No.: 792,208

[22] Filed: Nov. 13, 1991

[30] Foreign Application Priority Data

Dec. 20, 1990 [IT] Italy ................................ 22462/90
Dec. 20, 1990 [IT] Italy ................................ 22463/90

[51] Int. Cl.⁶ .............................................. G06F 13/14
[52] U.S. Cl. ........................................ 395/250; 395/500; 395/280; 364/239; 364/239.2; 364/239.3; 364/DIG. 1
[58] Field of Search ............... 395/275, 500, 250, 200, 395/325

[56] References Cited

U.S. PATENT DOCUMENTS

| | | | |
|---|---|---|---|
| 3,483,520 | 12/1969 | Broderick | 340/172.5 |
| 3,601,809 | 8/1971 | Gray et al. | 340/172.5 |
| 4,616,310 | 10/1986 | Dill et al. | 395/250 |
| 4,649,234 | 3/1987 | Jaus | 379/138 |
| 4,744,025 | 5/1988 | Lipcon et al. | 395/500 |
| 5,117,486 | 5/1992 | Clark et al. | 395/250 |
| 5,133,062 | 7/1992 | Joshi et al. | 395/500 |

FOREIGN PATENT DOCUMENTS

| | | |
|---|---|---|
| 0026649 | 4/1981 | European Pat. Off. |
| 0164972 | 12/1985 | European Pat. Off. |
| 0393319 | 10/1990 | European Pat. Off. |

Primary Examiner—Thomas C. Lee
Assistant Examiner—Sang Hui Kim
Attorney, Agent, or Firm—Spencer, Frank & Schneider

[57] ABSTRACT

A circuit device for interconnecting several processing units equipped with microprocessors includes at least two connection ports connecting the circuit device to the processing units, including a control unit for managing connection peculiarities using lock intelligence; an interface control unit for interfacing the processing units to memory; control unit for controlling the circuit device, connected to the connection ports and to the interface control unit, and for handling reading and writing of data to and from the connection ports and the interface control unit.

9 Claims, 2 Drawing Sheets

INTERFACE UNIT FOR DYNAMICALLY CONFIGURING A BUFFER IN DIFFERENT MODES TO STORE DATA TRANSFERS BASED UPON DIFFERENT CONNECTION DETAILS OF CONNECTED PROCESSING UNITS

BACKGROUND OF THE INVENTION

1. Field of the Invention

The present invention relates to a circuit device for interfacing between several processing units equipped with microprocessors.

2. Background Information

As known, when interconnecting devices having processors with different architectures, a problem arises with regard to homogeneous interconnection of processors especially if they work according to different methods and operations. In other words, there is a difficulty in making both the interconnected processors work as a unique homogeneous system where, however, the constituting parts normally work according to procedures, frequencies, operation logies very different from each other.

Besides, when interfacing between several processors or between computerized systems, comprising processors, there is a need for compact circuitry, preferably integrated, which is able to handle a plurality of functions relative to interfacing between the processors themselves.

Such functions are those relating to: handling controls for synchronous, asynchronous and DMA communication modes, for example, between the processor of a host computer and the processor of a speech processing module; for the control and handling of interrupt signals relative to the processor present in a speech processing module (Motorola 68000 processor), as well as for the handling of reset signals; for the decoding of all signals travelling over the interfacing device; for timing; and all distributed circuitries which at present realize and comply with such functions.

In order to solve such problems, various interconnection systems are in use. For instance, interconnection by bus is the system that allows exploitation of storage present in single processors, semaphorizing them by means of software or firmware in such a way as to make each processor work singularly by stopping in stand-by the other, and vice versa.

When processors are then coupled via serial lines, it is possible to use DMAs (direct memory accesses) or interrupt systems which in the same way allow to individuate, in suitable times, signals from both processor sending them over the connection bus, i.e., over the serial line, without creating collision between transmitted signal packets.

However, such solutions give rise to onerous circuit difficulties as hardware structures or software or firmware solutions are necessary which make the whole system massive and therefore slows down data transmission between processors which have to be interfaced to each other, thus subtracting process capacity from the interested processors.

Moreover, the circuitry required goes against the need for a unique assembled and as compact as possible system. Thus reducing the complexities and likewise the possibilities of errors during operation too, which are characteristic of the more complex systems is descrable.

SUMMARY OF THE INVENTION

It is an object of the present invention to overcome the above mentioned limitations of the known art by realizing and providing an integrated circuit device for interfacing between several processing units provided with microprocessors which allows interconnecting processors with different architectures and/or different modes of operation (synchronous and asynchronous) and/or different operating frequencies, in a manner that is simple and operatively linear without increasing the circuitry and without the need of allocating firmware or software which slow down operation of the whole system.

Advantageously, such a device should be integrable, to solve problems connected with space reduction and power dissipation of interfaced processing systems.

Obviously such realization, being more compact, also enhances the reliability of the interfacing system itself.

This object is achieved by a device having at least two ports and means for controlling processor communication via the ports.

BRIEF DESCRIPTION OF THE DRAWINGS

The device will now be described in detail hereinafter by way of two embodiments thereof with reference to the accompanying drawings attached merely by way of non-limiting examples, in which.

DETAILED DESCRIPTION OF THE PREFERRED EMBODIMENT(S)

Figure 1:
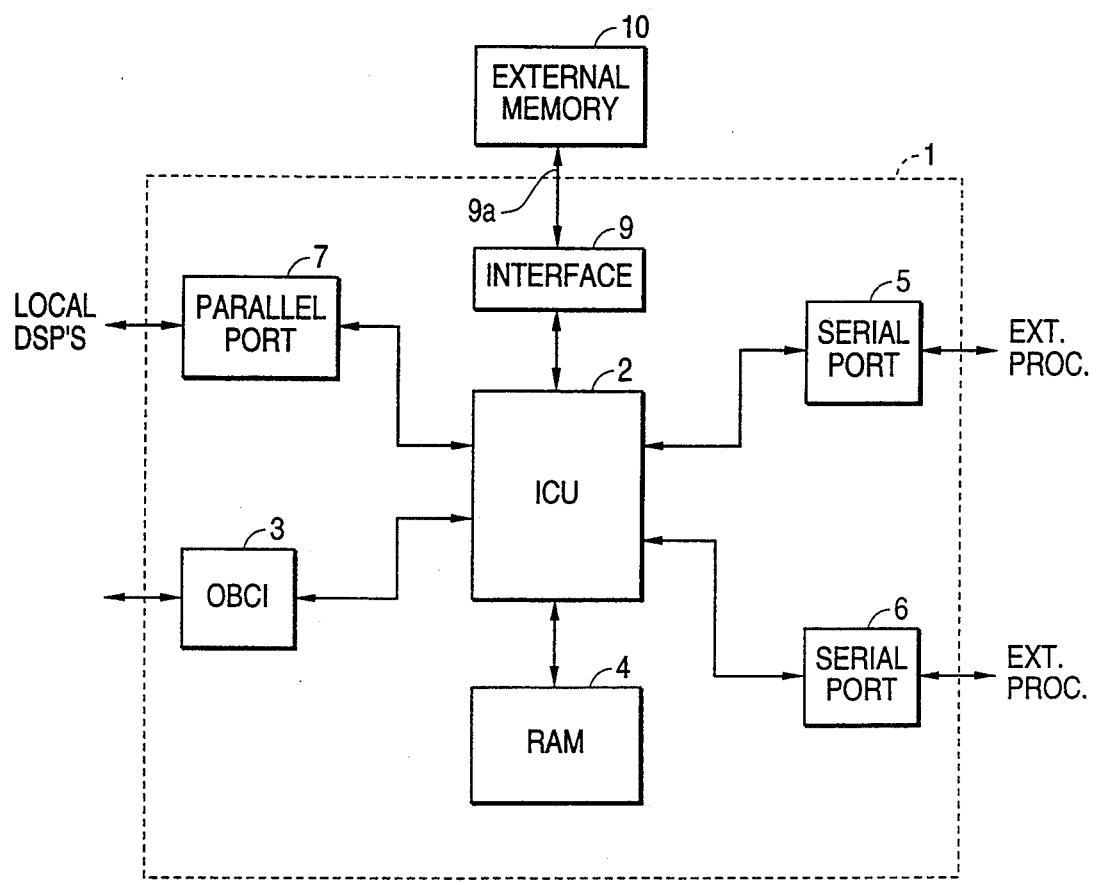
FIG. 1 is a schematic block diagram of a first embodiment of the device according to the present invention, connected to an external memory.

In FIG. 1 the whole device according to an embodiment the present invention has been indicated by reference numeral 1 and bordered by a broken line.

The reference numeral 2 indicates an internal control unit provided with its own memory 4 (RAM).

Block 3 represents an interfacing parallel port called OBCI (On Board Controller Interface).

Blocks 5 and 6 represent serial ports for connection to external processors.

Block 7 represents a parallel port for connection to local DSPs (digitial signal processors).

Block 9 represents the interface to external memory 10 linked through a bus 9a.

All ports, interfaces and circuits present in the device 1 are realized by logic circuitry.

Having described the overall structure of the whole device, which is, moreover, advantageously integrated on a single chip using VLSI technology, its operation according to the present invention follows.

In device 1 according to the present invention, the goal has been to optimize in an integrated fashion all the functions that are normally realized through distributed circuitry to permit connection between different processors, or different structures provided with processors.

Moreover, it has been a goal to concentrate in the device a series of functions, otherwise implemented by firmware or software, in order to handle interfacing. This allows to lightening of the load on the processors relieving them from all activities required for the scanning of various data transmitted by each processor.

By means of serial ports 5 and 6, as well as parallel communication ports 3 and 7, it is possible to link, via serial or via parallel, boards containing different processors enabling the transmission of data between the processors without creating collisions and with the same processing overhead.

Moreover, with such a device it is possible to physically and logically connect processors located either on the same structure or even on structures physically spaced from each other.

Through serial ports 6 and 5 it is possible to connect in a synchronous fashion different types of processors to each other so that data is transmitted in cascade and autonomously handled by controller 2, which also configures the external memory 10 according to the configuration suitable for the types of processors and processes being connected. The need for RAM memory 4 arises only where a variable configuration of the external memory 10 is required. Otherwise controller 2 may be designed in such a way as to satisfy the fixed requirement: for example if a fixed connection between two processors has to be provided in which one of them produces data and the other reads the same, the two actions being not synchronous, only simple queue has to be provided and no need exists for RAM memory 4.

Thus, it is possible to use device 1 as an interfacing system and utilize external memory 10 as an exchange memory relative to processors which have been interconnected and to processes being executed on them.

More precisely, thanks to the internal control circuitry 2, external memory 10 may be configured according to a LIFO (last-in-first-out) structure, i.e., the last data is outputted first, in such a way as to be able to exploit such type of memory structure for interfacing processors having different real time requirements and for making the operation asynchronous.

Similarly, when using external memory according to a FIFO (first-in-first-out) structure, it is possible to connect the processors by exploiting this external memory configured according to the criterion that the first data put into the memory is the first one which is then outputted, making use of the same synchronization characteristics as mentioned above.

Further, the internal control unit 2 also allows execution of reading and writing operations with memory 10 irrespective of the two processors being interfaced (multiport common memory modality).

More precisely, the parallel port 7 allows interfacing between standard processors, e.g., in the 80×86 family, while parallel port 3 allows interfacing to Digital Signal Processors (DSPs).

Parallel interfacing modality allows the above-mentioned processors to see the new memory blocks, virtualized by control unit 2, as normal memory locations provided with an enable signal.

Moreover, parallel ports may be provided with a double-buffering logic in order to reduce their unavailability because of multiple access to internal control resources and external memory (10).

It is also possible to represent the external memory 10 according to a ring structure, i.e., a circular queue, which is a type of structure that is of interest to certain processes.

Serial ports 6 and 5 allow the transmission of 4,096 Kbit/s with a 32 channel frame in such a way as to realize a serial connection between different physical entities (PBAs).

In other words, the basic philosophy is that a device exploits its internal controller 2, equipped with its own RAM 4, for interfacing parallel (7, 3) and serial (5 or 6) ports uses as work memory a normal RAM memory instead of specialized memories like FIFO and so on. Moreover, it is possible, depending on which processors are interfaced, to represent the memory as external memory of a set of n (e.g. 64) independent memory blocks, e.g., multiport RAM, FIFO, LIFO or circular queues. This allows the interfacing of several processes in execution on two processors independently connected and without overhead software.

The device according to the present invention allows to access in random mode to the external memory blocks handled as FIFOs or LIFOs. In practice, it is possible to access to the queues by specifying an address from the top, so as to implement a delay line. This facility is useful in several algorithms of digital signal processing.

In fact, each memory block appears like a sole entity (memory location) characterized by the function programmed each time.

The utilization of FIFO modality allows in particular the transparent connection of asynchronous processes resident on different processors either on the same PBA (interface through parallel ports) or on different PBAs (interface through multi-channel serial or both).

The serial ports are handled by control units in such a way as to appear like 32+32 independent channels. Each channel can be transformed on a FIFO queue in such a way as to extend the FIFO interface modality to different, serially connected, physical entities.

For each serial port, there has been provided the programmability of:
bit rate (up to 10M bits per second) in relation to external clock rate,
frame structure (from 1 up to 32 time slots),
channel number (both in transmission and in reception) corresponding to the frame strobe,
logic (positive or negative) of the input/output signals, and
clock edge (falling or rising) finding valid signals.

Each time slot contains a word of 16 bits. These can be considered as all data bits, or as part data bits and part control bits. By exploiting this feature, the device according to the present invention is able to automatically handle data packets issued through the serial links and to signal packet availability (the end of the packet) to the addressed processor.

In case of connection to a PCM link, the device is able to operate the conversion from A/u law and vice-versa, relieving the processors from this extra overhead.

During device operation, a number of special conditions or exception can occur requiring special attention from the user (processor) of the device. These situations can arise from wrong or unallowed operations or from special physical conditions related to the logical structure of the data block. The device is able to detect and to signal, separately to each processor port, the occurrence of such events (full queue, empty queue, invalid block access, write protection violation, data packet availability, etc.). On the basis of the exception type, indicated by the device via a suitable set of registers, the processors can undertake proper action. Moreover, this feature is extremely useful in a firmware developing phase.

It is clear that such a device can be advantageously integrated on a single chip. The choice of having an external memory 10 is mainly to permit a higher flexibility and if the external memory 10 needed to have a high capacity it might not be possible to integrate it on the same chip. Nevertheless, in particular applications where the amount of external memory is fixed, predetermined and not too large, such external memory 10 maybe integrated on the same chip and permitting higher temporal performance.

Figure 2:
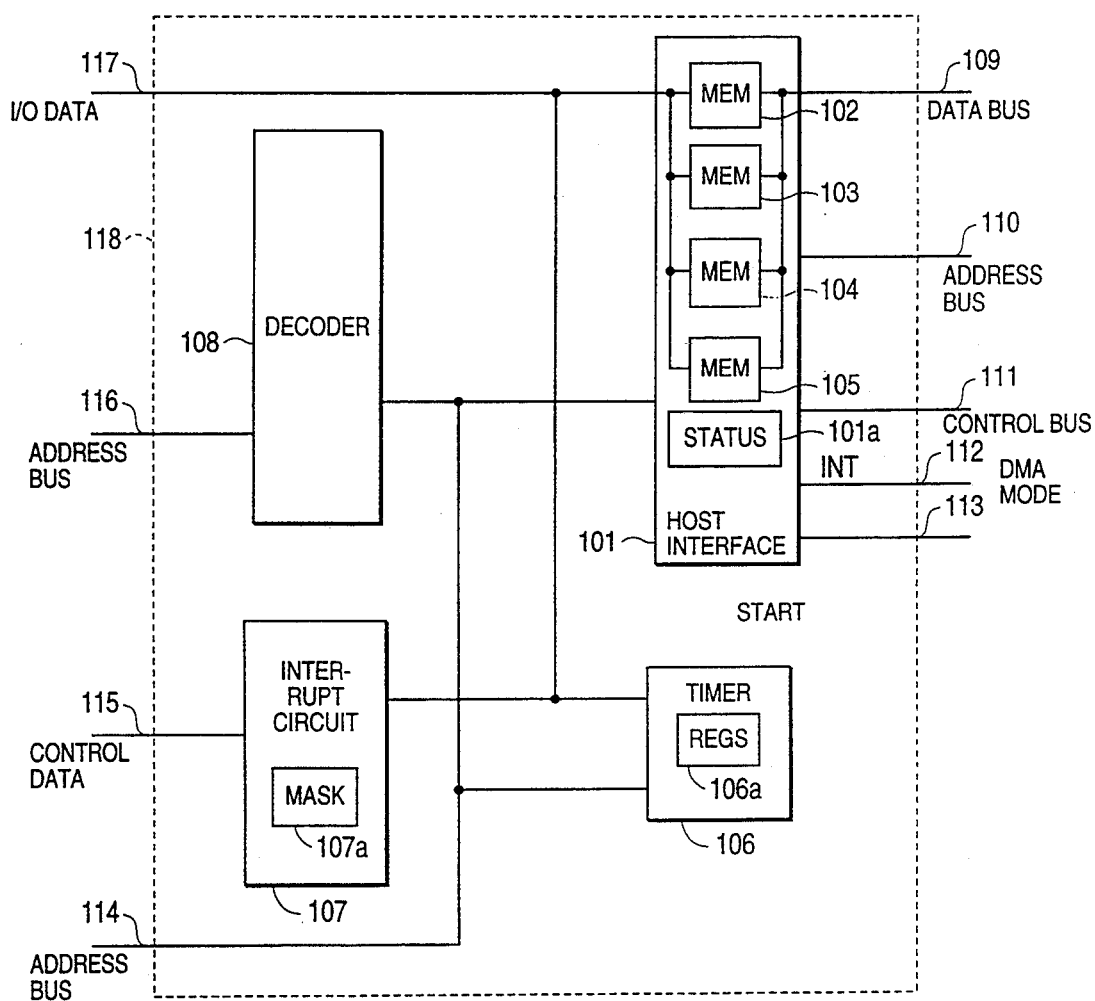
FIG. 2 is a schematic block diagram of a second embodiment of the device according to the present invention.

In FIG. 2 is shown a second device 118, according to another embodiment the present invention, particularly designed to interface a host computer, provided with a microprocessor of the iaPx80x86 family and a speech processing module, provided with a microprocessor of the 68000 family.

The device has been indicated as a whole by a block 118 and bordered by a broken line. Inside block 118, a first circuit block 101 represents the circuitry interfacing the host computer.

Such circuitry is structurally represented by and effectively embodied as a series of registers, used as memory devices, devoted to the exchange of data and controls between the host computer processor and the processor of the speech processing module not shown in FIG. 2.

Inside circuit block 101 further circuits sections 102, 103, 104 and 105 are shown. In particular, circuits 102 and 103 are the memory devices used for asynchronous data exchange and circuits 104 and 105 are the memory devices used for DMA data exchange; they behave like single-element queues.

Block 106 represents a timer circuit for the whole device 118 and, in particular, for programmable timing of the Motorola 6800 processor present in the speech processing module.

Block 107 represents a circuit for the handling of interrupts of 68000 processor present in the speech processing module.

Block 108 represents a decoding circuitry for decoding circulating signals to and from the device 118.

Reference numeral 109 designates a connection line representing a data bus to and from the host computer for the corresponding data transfer.

Reference numeral 110 indicates a connection line used as an address bus to permit circuit 101 to receive addresses from the host computer.

Reference numeral 111 represents a connections to and from the host computer, (control bus) for receiving and transmitting control signals.

References numeral 112 and 113 represent connection lines for DMA mode. Line 112 is used for transmitting interrupt signals. Lines 112 and 113 are output connections from circuit 101.

Reference numeral 114 represents an access line for addresses (address bus) coming from the board of the speech processing module.

Through a connection 115, all control data sent to the speech processing module, are sent to the interrupt control circuitry 107.

Reference numeral 116 represents addresses coming, through a bus, from the speech processing module for decoding by circuitry 108.

Finally, 117 stands for I/O connections for the input and output data from interfacing circuit 101.

The operation of the invention according to FIG. 2, follows.

Circuit block 101, which is specific for interfacing between a 68000 processor and the host computer, provides control handling by using internal registers (circuits 102 to 105) which, as said before, are specific for each determined operation mode.

In fact, circuit block 101, besides providing a series of registers used for the exchange of data, addresses and relative controls via lines 109, 110 and 11, respectively allows for the exchange of data and controls both asynchronously and with DMA handling, through a further register, status register 101a, which can be accessed by both the processors.

More specifically, in asynchronous mode, circuits 102 and 103, which are configured as bidirectional asynchronous ports, are used, while in DMA mode, circuits 104 and 105, which allow a fast exchange of large amounts of data, and are still also bidirectional ports, are used.

Obviously in both of these circumstances, decoding at the input and the output of the device 118 must occur.

Communication and handling of information exchange between respective processors may occur either by using the status register 101a, present in circuit 101, through polling, i.e., a scanning of states (which is performed merely by reading the status of the status register) or, the alternative, the dialogue can be handled through interrupts coming from both the host computer and the speech processing module which are, in practice, handled through a register, mask register 107a present in the interrupt circuit 107.

In such a circuit there is also an encoder provided (not shown) which encodes all incoming interrupts.

Such an interrupt block 107 also handles all resets of incoming/outgoing lines to/from the device itself in order to semaphorize all signals which go into and come out of the device.

Timing occurs under specific control of timer block 106 which clocks all the device functions. Timer 106 has registers 106a which allow its programming, both in terms of counting and start and stop, as well as reading of the status of the counting itself.

Normally, timing control occurs in two successive writing steps. Then a sixteen stage counter, present in the block, is started when it receives a start signal from circuit block 101, beginning to count starting from a value stored in the status register 101a.

At the end of counting, a low value, active interrupt signal is generated, which will remain in this logic status until a signal coming from the external processor stops the counting.

In other words, by using circuits 102 and 103 for asynchronous modes and 104 and 105 for DMA modes, under specific control of circuit block 101, by decoding all signals through decoder 108, and by timing all the input signals through block 106, it is possible to handle the interfacing between two different processors by using interrupt control block 107 as a handling control device (in this instance the interrupts mode is used, while if polling is used, such mode is not utilized).

Obviously the whole circuitry can be realized by using the VLSI technique in order to optimize integration.

All circuit blocks can be realized using GATE ARRAY technology with a number of 84 pins in this particular embodiment.

We claim:

1. A circuit device for interconnecting processing units equipped with micro-processors, said device enabling data transfers with the processing units each having different connection details, said device comprising:

at least two connection ports for connecting said circuit device to said processing units for data transfers therewith, the connection ports providing compatibility with connection details of said processing units;

internal memory means for storing data;

interface means for interfacing said circuit device to external memory means; and control means for controlling said circuit device, said control means being connected to said at least two connection ports, to said internal memory means, and to said interface means, and for directly providing data transfers to and from said connection ports, said internal memory means, and said interface means;

wherein said control means dynamically controls at least said internal memory means based upon requirements by said processing nits in at least one memory block of a type selected from the group including: multi-port RAM, FIFO, LIFO, and circular queue.

2. A circuit device according to claim 1, wherein at least said internal memory means stores data for exchange between said processing units.

3. A circuit device according to claim 1, further comprising control memory means, connected to said control means, for containing status information.

4. A circuit device according to claim 1, wherein said at least one memory block comprises a plurality of memory blocks, each memory block being logically independent of other memory blocks and being logically connected to said microprocessors of said processing units through said circuit device as a single entity, and wherein all data handling operations are autonomously controlled by said circuit device.

5. A circuit device according to claim 2, wherein said control means performs writing/reading operations to/from at least said internal memory means transparently to said microprocessors of said processing units, as if at least said internal memory means were a memory directly connected to and dedicated only to said microprocessors of said processing units.

6. A circuit device according to claim 1, wherein said control memory means stores information regarding configuration of said at least one memory block.

7. A circuit device according to claim 1, wherein said control means controls at least said internal memory means according to data received from at least one of said connection ports.

8. A circuit device according to claim 3, wherein said status information stored in said control memory means is readable by said processing units.

9. A circuit device according to claim 3, wherein in accordance with said status information stored in said control memory means, status messages are automatically sent to at least one of said processing units to signal status conditions.

* * * * *

UNITED STATES PATENT AND TRADEMARK OFFICE
CERTIFICATE OF CORRECTION

PATENT NO. : 5,446,843
DATED : August 29, 1995
INVENTOR(S) : Michele FUCITO, Mauro RECCHIA, Silvestro PUGLIA, Claudio MARIANI, Giulio COLANGELI and Antonio ROTUNNO It is certified that error appears in the above-indentified patent and that said Letters Patent is hereby corrected as shown below:

On title page of Patent No. 5,446,843 under [75] Inventors, the second inventor's <u>first</u> name should read: --MAURO--.

Signed and Sealed this

Seventeenth Day of October, 1995

Attest:

BRUCE LEHMAN

*Attesting Officer*  *Commissioner of Patents and Trademarks*